(12) United States Patent
Morioka

(10) Patent No.: US 10,485,026 B2
(45) Date of Patent: Nov. 19, 2019

(54) WIRELESS COMMUNICATION DEVICE, WIRELESS COMMUNICATION SYSTEM, AND WIRELESS COMMUNICATION METHOD

(71) Applicant: SONY CORPORATION, Tokyo (JP)

(72) Inventor: Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/384,397

(22) Filed: Dec. 20, 2016

(65) Prior Publication Data

US 2017/0105232 A1 Apr. 13, 2017

Related U.S. Application Data

(63) Continuation of application No. 13/579,185, filed as application No. PCT/JP2011/053711 on Feb. 21, 2011, now Pat. No. 9,554,400.

(30) Foreign Application Priority Data

Mar. 5, 2010 (JP) .................................. 2010-049410

(51) Int. Cl.
| H04L 5/00 | (2006.01) |
| H04W 72/04 | (2009.01) |
| H04W 74/06 | (2009.01) |
| H04W 74/08 | (2009.01) |

(52) U.S. Cl.
CPC ....... *H04W 74/0816* (2013.01); *H04L 5/0023* (2013.01); *H04W 72/042* (2013.01); *H04W 72/0446* (2013.01); *H04W 74/06* (2013.01); *H04W 74/085* (2013.01)

(58) Field of Classification Search
CPC ............ H04W 72/0446; H04W 74/06; H04W 74/0816
See application file for complete search history.

(56) References Cited

U.S. PATENT DOCUMENTS

| 7,822,009 B2 | 10/2010 | Cheng et al. |
| 7,920,497 B2 | 4/2011 | Gaur |
| 8,274,961 B2 | 9/2012 | Sakoda et al. |

(Continued)

FOREIGN PATENT DOCUMENTS

| JP | 2007-214920 A | 8/2007 |
| JP | 2008-252867 A | 10/2008 |
| WO | 2009/027931 A2 | 3/2009 |

OTHER PUBLICATIONS

Office Action for KR Patent Application No. 10-2012-7022360, dated Oct. 27, 2015.

(Continued)

*Primary Examiner* — Jung H Park
(74) *Attorney, Agent, or Firm* — Chip Law Group

(57) ABSTRACT

A wireless communication device including: a transmitter unit configured to transmit an RTS (Request To Send) packet to a plurality of wireless communication devices; a receiver unit configured to receive a CTS (Clear To Send) packet responding to the RTS packet; and a data processing unit configured to transmit data packets from the transmitter unit to the plurality of wireless communication devices when the CTS packet is received by the receiver unit from at least some of the plurality of wireless communication devices.

12 Claims, 11 Drawing Sheets

(56) References Cited

U.S. PATENT DOCUMENTS

| | | |
|---|---|---|
| 8,432,888 B2 | 4/2013 | Sakoda et al. |
| 2005/0002355 A1 | 1/2005 | Takano |
| 2005/0096091 A1 | 5/2005 | Sharony |
| 2005/0138199 A1 | 6/2005 | Li et al. |
| 2005/0141420 A1 | 6/2005 | Li et al. |
| 2005/0169232 A1 | 8/2005 | Sakoda et al. |
| 2005/0254513 A1 | 11/2005 | Cave et al. |
| 2005/0259686 A1* | 11/2005 | Lewis ................. H04L 25/0226 370/469 |
| 2006/0114826 A1 | 6/2006 | Brommer |
| 2007/0153714 A1 | 7/2007 | Shipra et al. |
| 2007/0248089 A1 | 10/2007 | Redi et al. |
| 2007/0291913 A1 | 12/2007 | Trainin |
| 2008/0232490 A1 | 9/2008 | Gross et al. |
| 2009/0135972 A1 | 5/2009 | Tanaka et al. |
| 2009/0303888 A1 | 12/2009 | Ariyur et al. |
| 2009/0310619 A1 | 12/2009 | Brommer |
| 2010/0080173 A1 | 4/2010 | Takagi |
| 2010/0202347 A1* | 8/2010 | Sridhara ............... H04L 1/1607 370/328 |
| 2010/0284393 A1 | 11/2010 | Abraham et al. |
| 2010/0322166 A1* | 12/2010 | Sampath ............. H04W 72/121 370/329 |
| 2011/0002319 A1 | 1/2011 | Husen et al. |
| 2011/0096711 A1* | 4/2011 | Liu ..................... H04W 74/008 370/312 |
| 2011/0141969 A1 | 6/2011 | Sridhara et al. |
| 2011/0149941 A1* | 6/2011 | Gong .................. H04B 7/0634 370/343 |
| 2011/0150004 A1* | 6/2011 | Denteneer ............ H04L 5/0023 370/476 |
| 2011/0280188 A1 | 11/2011 | Jeon et al. |
| 2012/0082200 A1 | 4/2012 | Verikoukis et al. |
| 2012/0307696 A1 | 12/2012 | Morioka |
| 2012/0314633 A1 | 12/2012 | Morioka |

OTHER PUBLICATIONS

International Search Report and Written Opinion of PCT Application No. PCT/JP2011/053711, dated Mar. 22, 2011, 05 pages of English Translation and 05 pages of ISRWO.

* cited by examiner

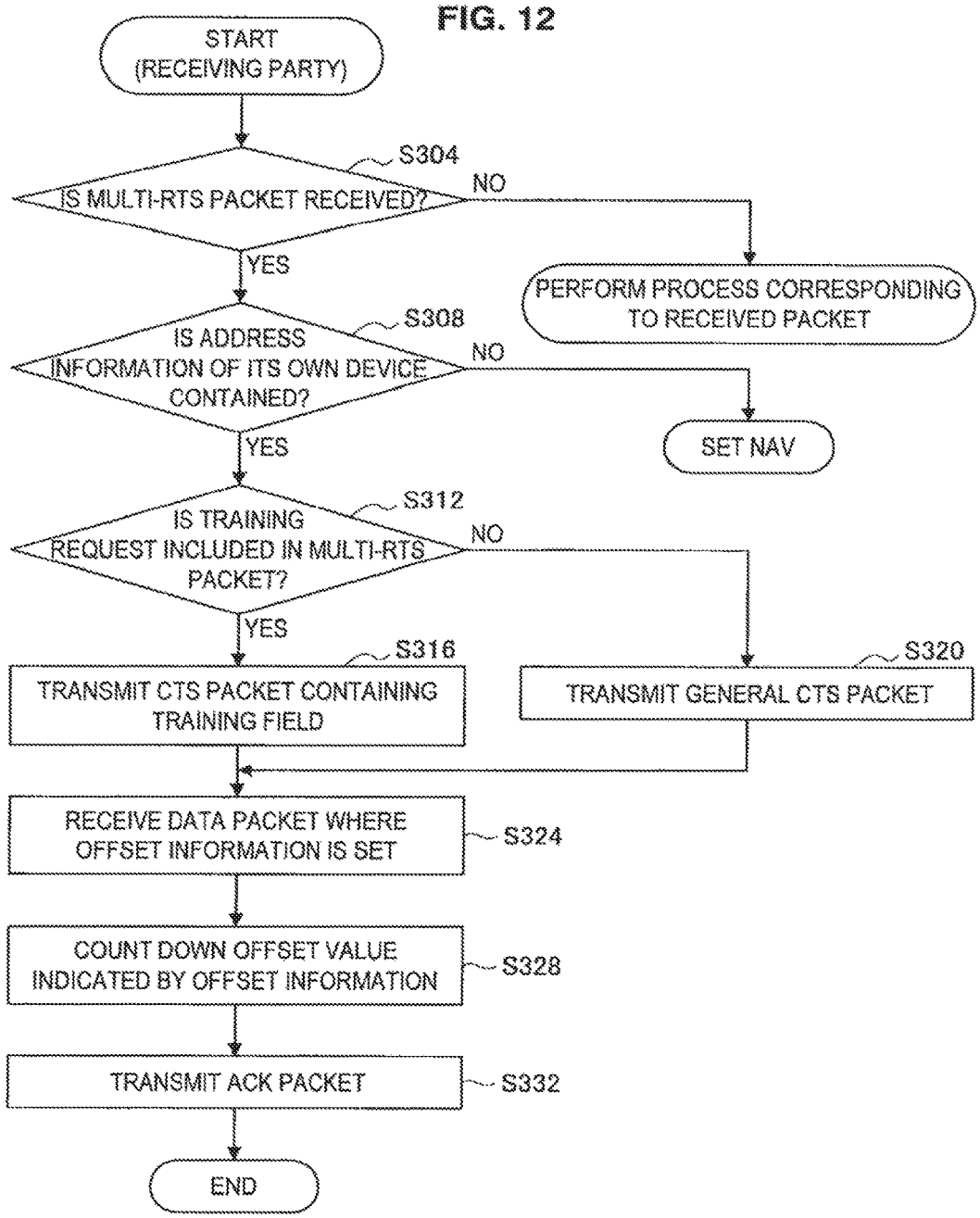

WIRELESS COMMUNICATION DEVICE, WIRELESS COMMUNICATION SYSTEM, AND WIRELESS COMMUNICATION METHOD

CROSS REFERENCE TO RELATED APPLICATION

The present application is a continuation application of U.S. patent application Ser. No. 13/579,185, filed Aug. 15, 2012, which is a National Stage of PCT/JP2011/053711, filed Feb. 21, 2011, and claims the benefit of priority from prior Japanese Priority Patent Application JP 2010-049410 filed in the Japan Patent Office on Mar. 5, 2010, the entire content of which is hereby incorporated by reference.

TECHNICAL FIELD

The present invention relates to a wireless communication device, a wireless communication system, and a wireless communication method and program.

BACKGROUND ART

In recent years, a wireless LAN (Local Area Network) system, which is typified by IEEE (Institute of Electrical and Electronics Engineers) 802.11, has come into wide use instead of a wired network owing to advantages of a high degree of freedom of equipment and the like. For example, IEEE 802.11a/g has come into wide use and IEEE 802.11n is expected to become widely available in the future.

Currently, IEEE 802.11ac is supposed to be employed as a next-generation wireless LAN standard. The IEEE 802.11ac is expected to employ SDMA (Space Division Multiple Access) in which wireless resources on a spatial axis are shared among a plurality of users. SDMA enables simultaneous one-to-many communications using the same frequency, which makes it possible to seek a significant improvement of the transmission rate.

A fair number of wireless LAN systems avoid interference between wireless communication devices by access control based on carrier sense, such as CSMA/CA (Carrier Sense Multiple Access with Collision Avoidance).

For example, a wireless communication device performing data transmission transmits an RTS (Request To Send) packet and initiates transmission of a data packet upon receipt of a CTS (Clear To Send) packet from a wireless communication device of a transmission destination. Further, a wireless communication device having received at least one of RTS and CTS packets which are not destined for its own station sets NAV (Network Allocation Vector) based on duration information contained in the received packet to avoid interference. The interference avoidance based on the duration information is described in, for example, the following patent literature 1.

CITATION LIST

Patent Literature

Patent Literature 1: JP 2008-252867A

SUMMARY OF INVENTION

Technical Problem

According to a simple combination of the IEEE 802.11ac and RTS/CTS, a plurality of wireless communication devices simultaneously transmit CTS packets in response to an RTS packet transmitted by an access point. On this account, there has been a problem in that it is difficult for the access point to determine from which wireless communication device the CTS packet has been transmitted and to determine a transmission destination of a data packet.

In view of the foregoing problem, the present invention is directed to a new, improved wireless communication device, wireless communication system, and wireless communication method and program, capable of transmitting data packets without specifying a transmission source device of a CTS packet.

Solution to Problem

According to an aspect of the present invention in order to solve the above-mentioned problem, there is provided a wireless communication device including: a transmitter unit configured to transmit an RTS (Request To Send) packet to a plurality of wireless communication devices; a receiver unit configured to receive a CTS (Clear To Send) packet responding to the RTS packet; and a data processing unit configured to transmit data packets from the transmitter unit to the plurality of wireless communication devices when the CTS packet is received by the receiver unit from at least some of the plurality of wireless communication devices.

Each of data packets to the plurality of wireless communication devices may include timing information designating a transmission timing of an ACK packet from a wireless communication device at a transmission destination with respect to the data packet.

The data processing unit may set the timing information such that transmission timings of the ACK packet from each of the plurality of wireless communication devices are different from each other.

The data processing unit may set the timing information such that ACK packets transmitted from each of the plurality of wireless communication devices do not overlap each other on a time axis.

The transmitter unit may transmit the data packets to the plurality of wireless communication units by SDMA (Space Division Multiple Access).

According to another aspect of the present invention in order to achieve the above-mentioned object, there is provided a wireless communication system including: a plurality of first wireless communication devices; and a second wireless communication device including: a transmitter unit configured to transmit an RTS (Request To Send) packet to the plurality of first wireless communication devices; a receiver unit configured to receive a CTS (Clear To Send) packet responding to the RTS packet; and a data processing unit configured to transmit data packets from the transmitter unit to the plurality of first wireless communication devices when the CTS packet is received by the receiver unit from at least some of the plurality of first wireless communication devices.

Two or more first wireless communication devices having received the RTS packet may transmit the same CTS at a timing according to an identical criterion.

Each of data packets to the plurality of wireless communication devices may include timing information designating a transmission timing of an ACK packet from a wireless communication device at a transmission destination with respect to the data packet, and each of the plurality of wireless communication devices may transmit the ACK packet at a timing designated by the timing information.

According to another aspect of the present invention in order to solve the above-mentioned problem, there is provided a wireless communication method including: transmitting an RTS (Request To Send) packet to a plurality of wireless communication devices; receiving a CTS (Clear To Send) packet responding to the RTS packet; and transmitting data packets to the plurality of wireless communication devices when the CTS packet is received from at least some of the plurality of wireless communication devices.

According to another aspect of the present invention in order to solve the above-mentioned problem, there is provided a program configured for a computer to implement functions of: a transmitter unit configured to transmit an RTS (Request To Send) packet to a plurality of wireless communication devices; a receiver unit configured to receive a CTS (Clear To Send) packet responding to the RTS packet; and a data processing unit configured to transmit data packets from the transmitter unit to the plurality of wireless communication devices when the CTS packet is received by the receiver unit from at least some of the plurality of wireless communication devices.

Advantageous Effects of Invention

As described above, according to the present invention, it is possible to transmit data packets without specifying a transmission source device of a CTS packet.

BRIEF DESCRIPTION OF DRAWINGS

FIG. 12 is a flow chart illustrating the operation of a station according to an embodiment of the present invention.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In the present specification and drawings, a plurality of elements that have substantially the same function and structure may be denoted by the same reference sign followed by different numbers. For example, a plurality of elements that have substantially the same function and structure may be denoted by stations 20#1, 20#2 and 20#3 or branches 40-1, 40-2 and 40-N. However, if a plurality of elements that have substantially the same function and structure do not have to be differently denoted, the plurality of elements are only denoted by the same sign. For example, if the stations 20#1, 20#2 and 20#3 do not have to be differently denoted, the stations are denoted by the same reference sign, i.e., 20.

Description of Embodiments] will be described in order of the following items:
1. Structure of Wireless Communication System
2. Structure of Wireless Communication Device
3. Method of Access Control
4. Operation of Wireless Communication Device
(Operation of Access Point)
(Operation of Station)
5. Conclusion

1. STRUCTURE OF WIRELESS COMMUNICATION SYSTEM

Firstly, a structure of a wireless communication system 1 according to an embodiment of the present invention will be described with reference to FIG. 1.

Figure 1:
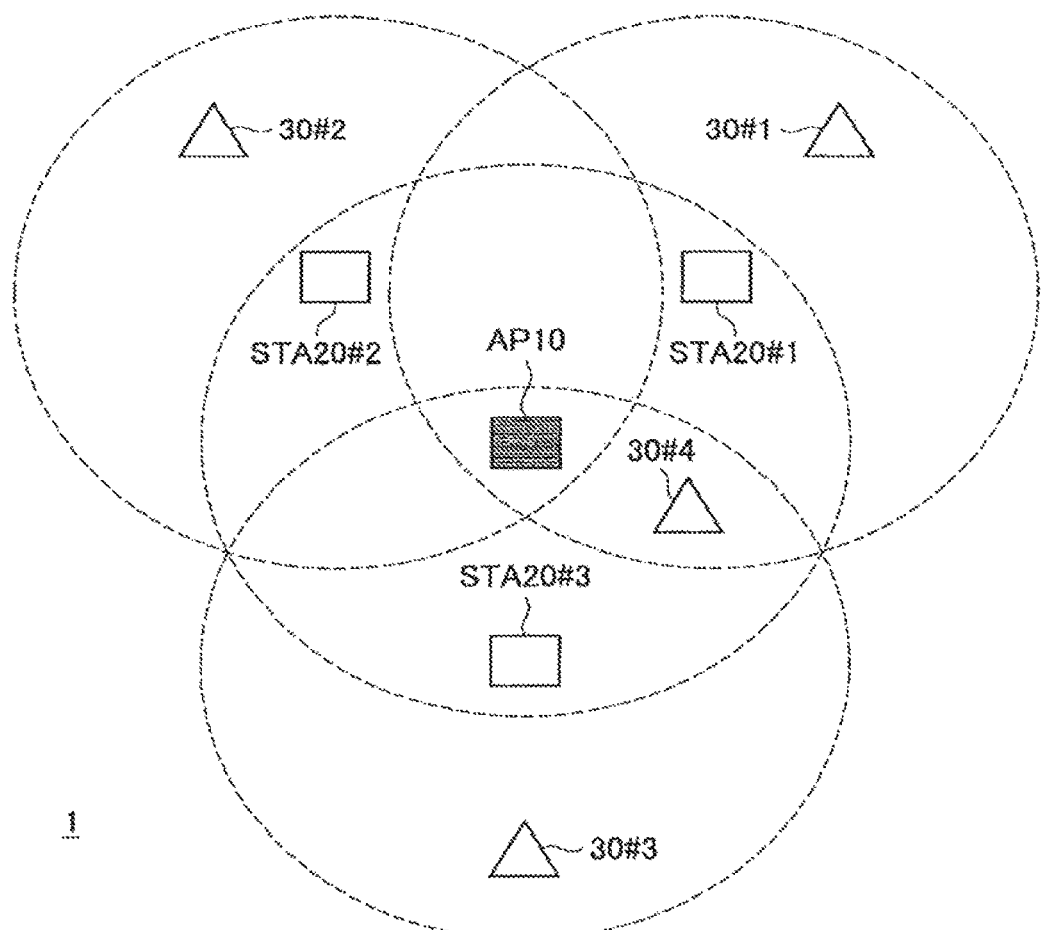
FIG. 1 is an explanatory diagram illustrating a structure of a wireless communication system 1 according to an embodiment of the present invention.

FIG. 1 is an explanatory diagram illustrating a structure of a wireless communication system 1 according to an embodiment of the present invention. As shown in FIG. 1, the wireless communication system 1 includes an access point 10, stations 20#1~20#3, and neighboring wireless devices 30#1~30#4.

The stations 20#1~20#3 are located within communication coverage of the access point 10, while the access point 10 is located within communication coverage of the stations 20#1~20#3. On this account, the stations 20#1~20#3 may establish a direct communication with the access point 10. That is, the stations 20#1~20#3 fall within the coverage of the access point 10, and a plurality of wireless communication devices made up of the stations 20#1~20#3 and the access point 10 constitute a communication group 1 (BSS: Basic Service Set).

The access point 10 is a wireless communication device conforming to, for example, IEEE 802.11 ac and performs SDMA (Space Division Multiple Access) by means of an adaptive array antenna. Specifically, the access point 10 establishes a one-to-many communication by multiplexing packets transmitted to a plurality of stations 20 with respect to the same time axis and the same frequency band or by separating packets, which are transmitted from a plurality of stations 20 through the same time axis and the same frequency band, by transmission sources. Further, the access point 10 may establish a one-to-one communication with each of the stations 20.

Like the access point 10, the station 20 is also a wireless communication device conforming to, for example, IEEE 802.11ac and performs SDMA (Space Division Multiple Access) by means of an adaptive array antenna. However, the station 20 may include fewer antennas than the access point 10 since the station 20 performs separation of packets upon receipt of the packets but does not perform multiplexing of packets to be transmitted. Some of the stations 20#1~20#3 may be a wireless communication device conforming to a traditional standard, such as IEEE 802.11a/g.

It may be determined upon manufacturing a wireless communication device or by negotiation upon processing a connection of a wireless communication device whether the wireless communication device will operate as the access point 20 (Group Owner) or the station 10 (Client).

The wireless communication device, such as the access point 10 and the station 20, is not limited to any specific hardware type. For example, the wireless communication device, such as the access point 10 and the station 20, may be an information processing device, such as a PC (Personal Computer), a household image processing device (e.g., a DVD recorder, a video deck, or the like), a PDA (Personal Digital Assistant), a household game machine, or a household appliance. Further, the wireless communication device, such as the access point 10 and the station 20, may be an information processing device, such as a mobile phone, a PHS (Personal Handyphone System), a portable music player, a portable image processing device, or a portable game machine.

For the wireless communication system 1, RTS/CTS handshake may be used to prevent interference between communication by the access point 10 and the station 20 and communication by the neighboring wireless devices 30#1~30#4. However, the following problems, which will be described with reference to FIGS. 2 and 3, may arise depending on the arrangement format of the wireless communication system 1 and the RTS/CTS handshake.

Figure 2:
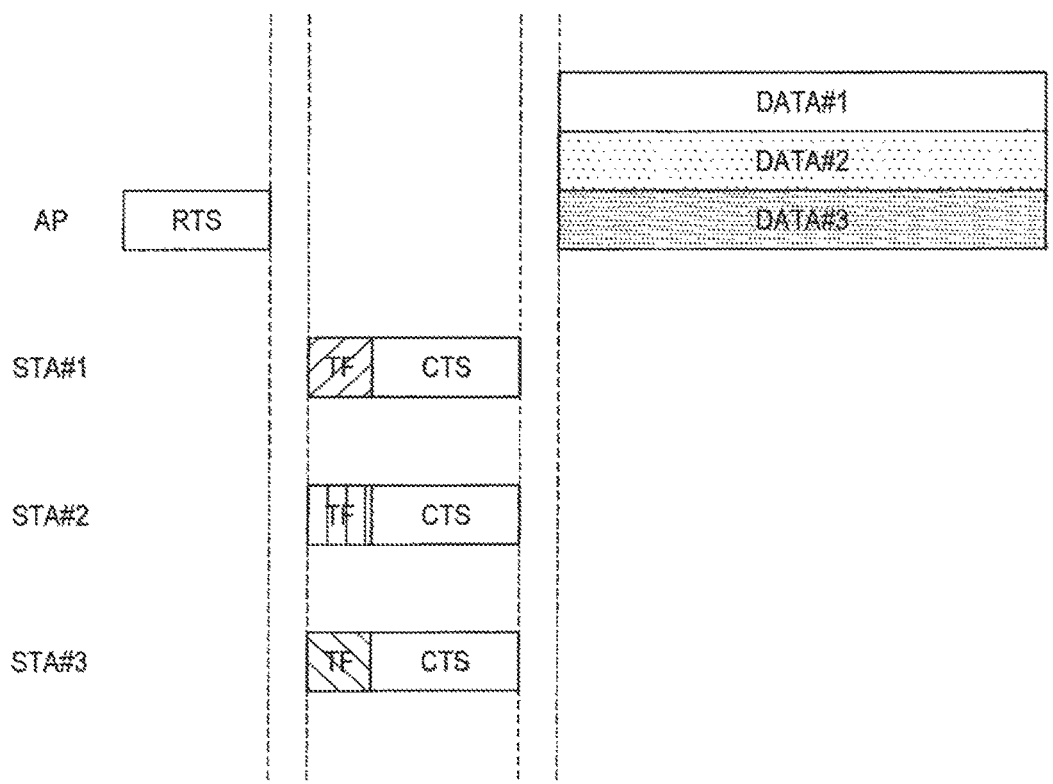
FIG. 2 is an explanatory diagram illustrating RTS/CTS handshake in a wireless communication system according to a comparative example.
Figure 3:
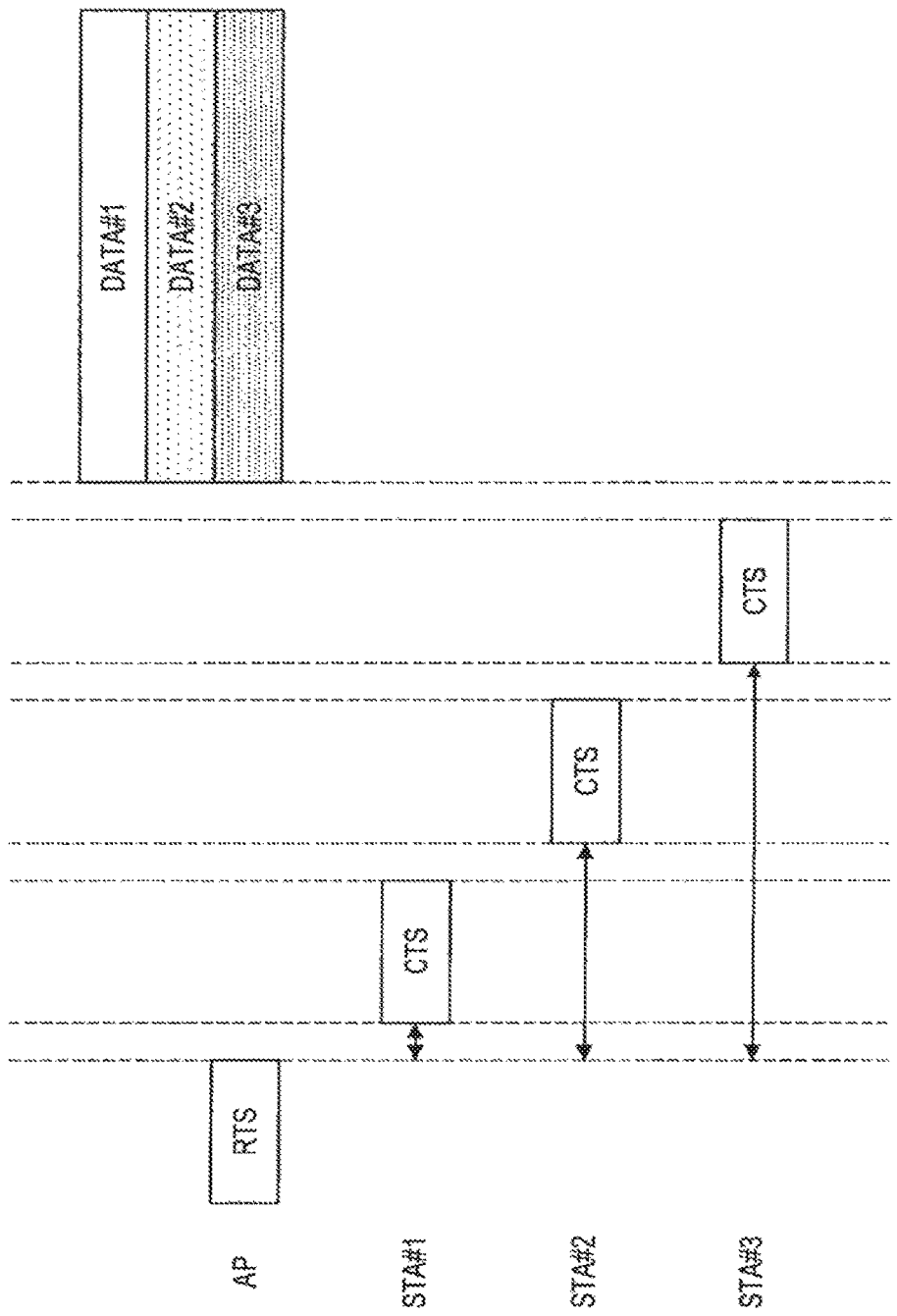
FIG. 3 is an explanatory diagram illustrating RTS/CTS handshake in a wireless communication system according to a comparative example.

FIGS. 2 and 3 are explanatory diagrams illustrating RTS/CTS handshake in a wireless communication system according to comparative examples. In the example shown in FIG. 2, the plurality of stations #1~#3 transmit CTS packets at the same time with respect to an RTS packet transmitted by the access point. In this case, each of the stations transmits a CTS packet with an orthogonal training field added so that the access point may detect from which station each of the CTS packets has been transmitted.

According to IEEE 802.11, however, SIFS (Short Interframe Space), which is a packet transmission interval, has an allowable error of +−10%. On this account, the transmission timings of the CTS packets by the stations #1~#3 may deviate from each other by up to 20%. Consequently, since the orthogonality of the training field which is added to each of the CTS packets by each of the stations may be removed, it is difficult to detect from which wireless communication device the CTS packet has been transmitted and to determine a transmission destination of a data packet.

In the example shown in FIG. 3, the plurality of stations #1~#3 disperse the CTS packets in time and transmit the dispersed CTS packets with respect to the RTS packet which has been transmitted by the access point. On this account, the access point may specify a transmission source station of each of the CTS packets based on the reception timing of each of the CTS packets. In the example shown in FIG. 3, however, since each of the stations disperses the CTS packets in time and transmits the dispersed CTS packets, overhead increases.

In view of the foregoing situation, the embodiments of the present invention have been conceived. According to the embodiments of the present invention, it is possible to transmit a data packet without specifying a transmission source device of a CTS packet. The embodiments of the present invention will be described in detail.

2. STRUCTURE OF WIRELESS COMMUNICATION DEVICE

Figure 4:
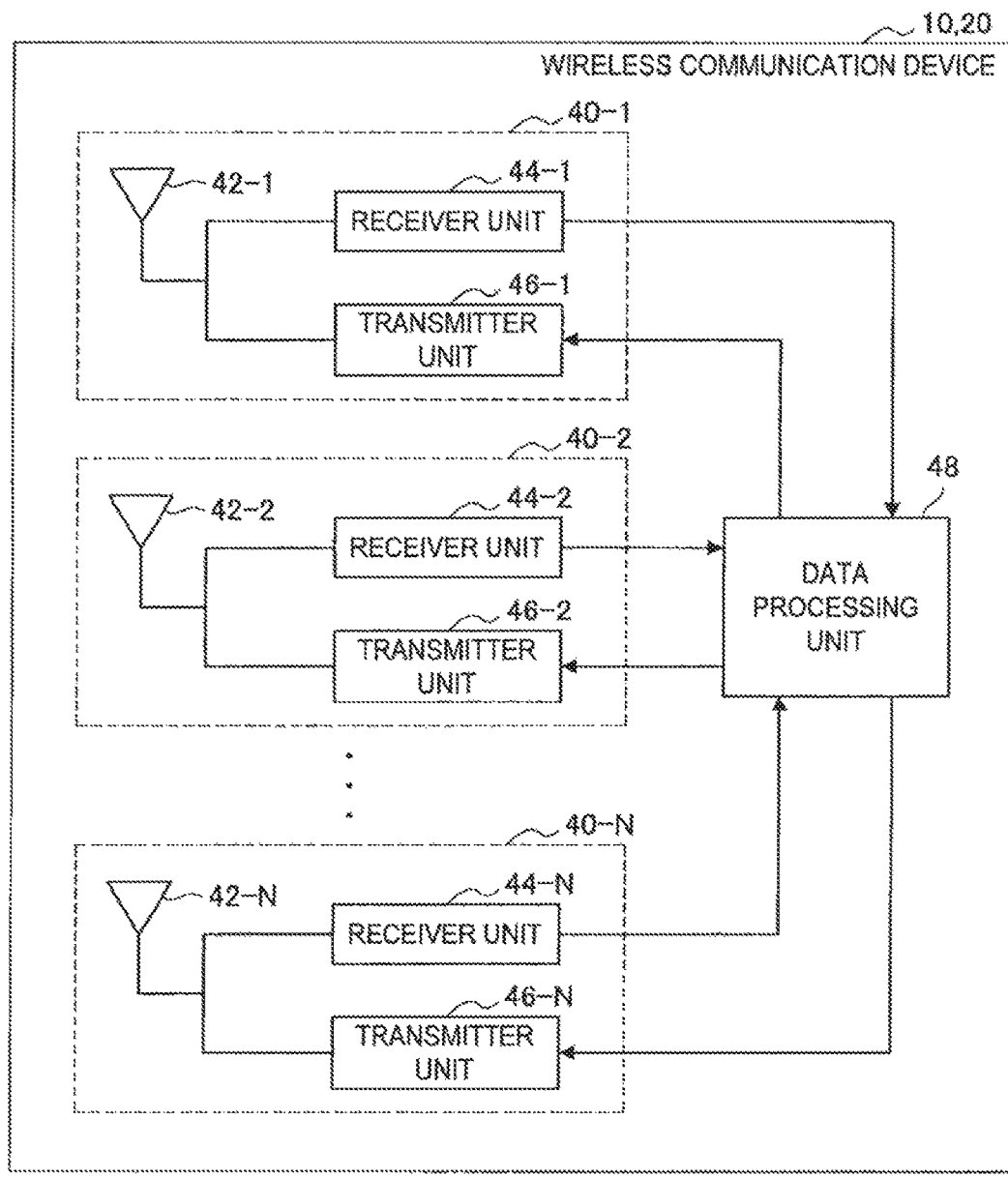
FIG. 4 is an explanatory diagram illustrating a structure of a wireless communication device, such as an access point 10 or a station 20, according to an embodiment of the present invention.

FIG. 4 is an explanatory diagram illustrating a structure of a wireless communication device, such as the access point 10 or the station 20, according to an embodiment of the present invention. As shown in FIG. 4, the wireless communication device includes N sets of branches 40-1~40-N and a data processing unit 48. Each of the branches 40 includes an antenna element 42, a receiver unit 44, and a transmitter unit 46.

That is, the wireless communication device includes N antenna elements 42-1~42-N and may function the N antenna elements 42-1~42-N as adaptive array antennas by multiplying communication packets by each of the antenna elements 42 by appropriate weights. The wireless communication device operating as the access point 10 may increase the number of stations which can establish a simultaneous communication by SDMA by including more antenna elements 42.

The data processing unit 48 generates transmission packets and distributes the transmission packets to the branches 42-1~42-N in response to the transmission request of an upper-layer application. More specifically, the data processing unit 48 of the wireless communication device operating as the access point 10 generates transmission packets for each of the stations 20 and multiplies each of the transmission packets by a transmission weight for an adaptive array antenna of each of the branches 42. The data processing unit 48 supplies the transmission packets, which have been spatially separated for each destination due to the multiplication, to the branches 42-1~42-N as digital baseband signals.

The data processing unit 48 may learn a weight for an adaptive array antenna by applying an adaptive algorithm, such as RLS (Recursive Least Square), to a training field which is a known sequence received from a destination device.

If the digital baseband signal is supplied from the data processing unit 25, each of the transmitter units 46-1~46-N performs signal processing, such as encoding or modulating, on the digital baseband signal. Further, each of the transmitter units 46-1~46-N performs D/A conversion and upconversion of the digital baseband signal and supplies an analog high-frequency signal to the antenna elements 42-1~42-N. The antenna elements 42-1~42-N transmit the high-frequency signal, which is supplied from the transmitter units 46-1~46-N, as a wireless signal.

If the high-frequency signal received by the antenna elements 42-1~42-N is supplied, each of the receiver units 44-1~44-N performs downconversion and A/D conversion of the high-frequency signal. Further, each of the receiver units 44-1~44-N performs signal processing, such as demodulation or combining, on the baseband signal which has been subjected to the A/D conversion, and supplies the signal-processed baseband signal to the data processing unit 48.

The data processing unit 48 multiplies the baseband signal supplied from the receiver units 44-1~44-N by a reception weight for an adaptive array antenna. The data processing unit 48 supplies a transmission packet allocated for its own device among the transmission packets, which have been spatially separated by the multiplication, to an upper-layer application. If the wireless communication device employs a MIMO technique, the spatial separation may include separation of spatially multiplexed MIMO channels in addition to separation of transmission packets for each destination.

The data processing unit 48 performs processing of communication protocol on a MAC (Media Access Control) layer when communication by the branches 40-1~40-N is performed. Specifically, the data processing unit 48 performs access control by performing generation of packets for RTS/CTS handshake (e.g., multi-RTS, CTS, data packet, ACK, etc. which will be described), transmission instruction or the like. The access control according to an embodiment of the present invention using the RTS/CTS handshake will be described.

3. METHOD OF ACCESS CONTROL

Figure 5:
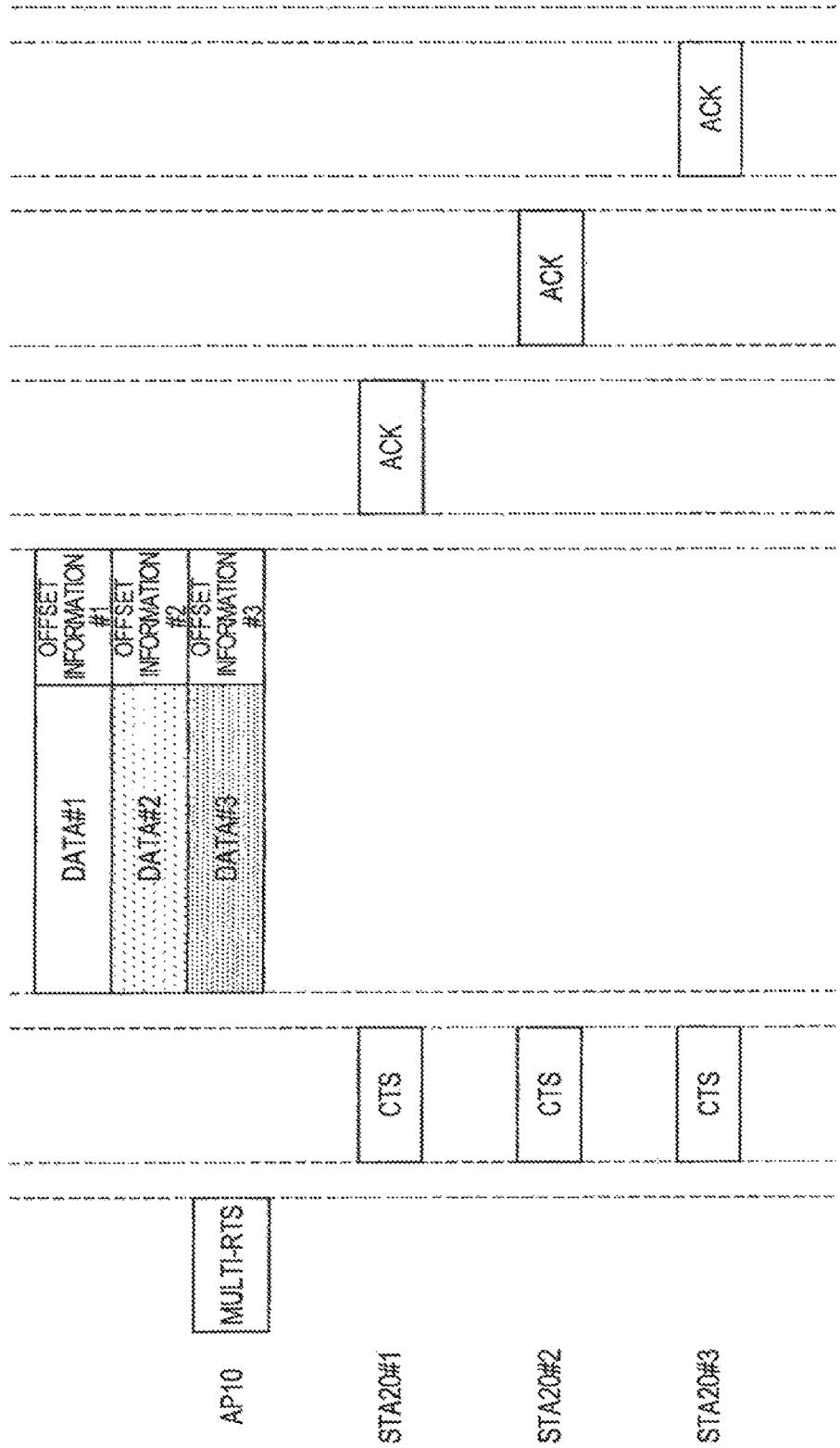
FIG. 5 is an explanatory diagram illustrating access control according to an embodiment of the present invention.

FIG. 5 is an explanatory diagram illustrating access control according to an embodiment of the present invention. As shown in FIG. 5, the access point 10, which wishes to transmit data to the stations 20#1~20#3, transmits a multi-RTS packet as a transmission request packet.

Figure 6:
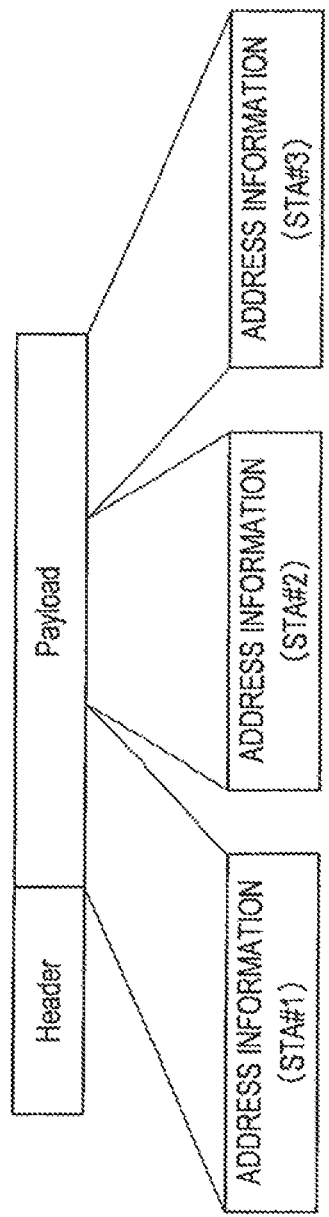
FIG. 6 is an explanatory diagram illustrating a structure of a multi-RTS packet.

FIG. 6 is an explanatory diagram illustrating a structure of a multi-RTS packet. As shown in FIG. 6, the multi-RTS packet includes a header and a payload. The payload includes address information of the stations 20#1~20#3 to which the access point 10 wishes to transmit data packets. In other words, the access point 10 performs a transmission request to the stations 20#1~#3 by recording the address information of the stations 20#1~#3 on the multi-RTS packet.

If the stations 20#1~#3 receive the multi-RTS packet containing the address information of their own devices, the stations 20#1~#3 transmit CTS (Clear To Send) packets to the access point 10 according to the same criterion SIFS. As a result, the CTS packets are almost simultaneously transmitted from the stations 20#1~#3.

On this account, it is difficult for the access point 10 to determine from which station 20 the CTS packet has been transmitted. However, if it is eventually determined that the data packet has normally been received by each of the stations 20, a benefit of determining a transmission source station of each of the CTS packets may be considered as insignificant. That is because although the data packet is not transmitted to a station 20 which cannot be confirmed as a transmission source station of a CTS packet, an effect on the time taken in data transmission to another station may be considered as insignificant if SDMA is used.

Figure 7:
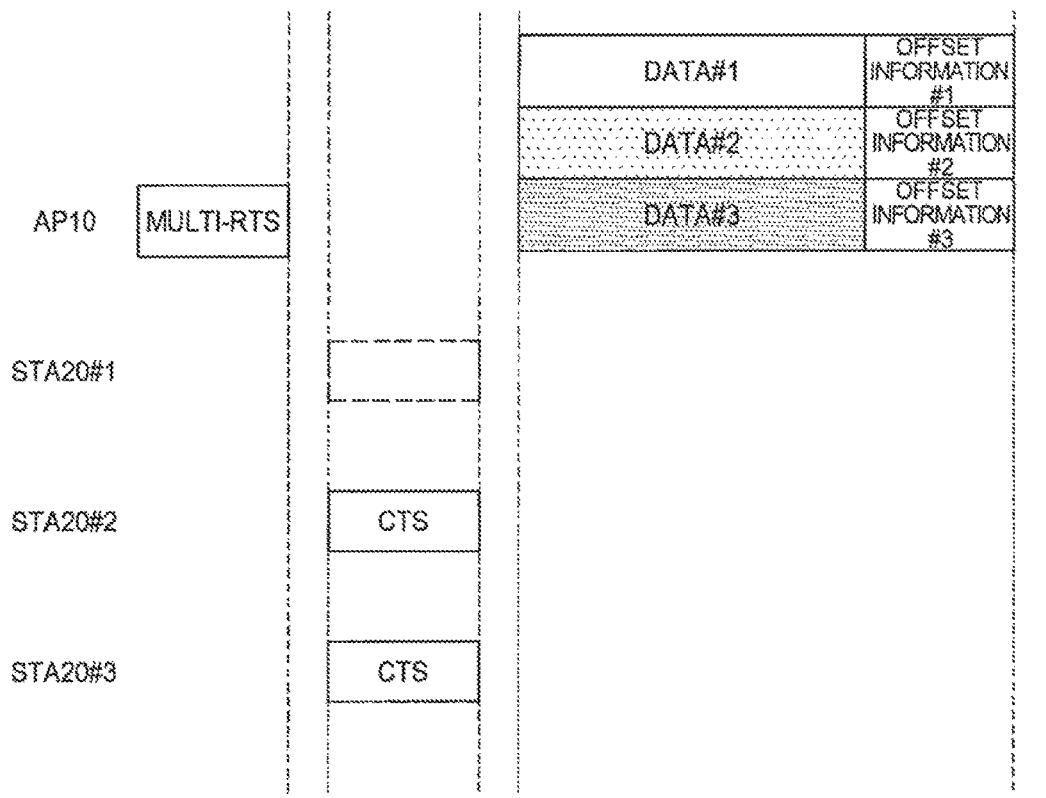
FIG. 7 is an explanatory diagram illustrating access control according to an embodiment of the present invention.

In a situation where a CTS packet cannot be received from the station 20#1 as shown in FIG. 7, the neighboring wireless device 30#1 may make a transmission reservation. However, since the station 20#1 belongs to the access point 10, a data transmission destination from the neighboring wireless device 30#1 may not be considered the station 20#1. In this case, although the access point 10 transmits a data packet to the station 20#1 as shown in FIG. 7, the transmission of the data packet will not hinder the communication of the station 20#1.

The access point 10 according to an embodiment of the present invention spatially multiplexes the data packets (DATA#1~DATA#3) and transmits the spatially multiplexed data packets to all of the stations 20#1~#3, which are designated in the multi-RTS packet, without determining transmission source stations of CTS packets. However, the access point 10 needs to determine whether or not the stations 20#1~#3 have normally received the data packets. On this account, the access point 10 disperses transmission of ACK packets from the stations 20#1~#3 in time, thereby correctly determining a transmission source station of each of the ACK packets.

Specifically, as shown in FIG. 5, the data processing unit 48 of the access point 10 sets offset information for the data packets (DATA#1~DATA#3) for each of the stations 20.

The offset information refers to timing information which designates the transmission timing of an ACK packet from the station 20. More specifically, if the lengths of time of data packets for each of the stations 20 are identical to each other as shown in FIG. 5, the offset information may be information indicating the elapsed period of time from the end of reception of the data packet. Alternatively, the offset information may be information indicating the time to transmit an ACK packet or information indicating the transmission order of the ACK packet.

The data processing unit 48 of the stations 20#1~#3 checks offset information which is set for the data packet for each of the stations and, as shown in FIG. 5, transmits the ACK packet from each of the branches 40 at the transmission timings which are designated by the offset information.

Specifically, the station 20#1 checks the offset information #1 which is set for the data packet (DATA#1), and initiates the transmission of the ACK packet after a period of time corresponding to the offset information #1 is elapsed from the end of reception of the data packet. Likewise, the station 20#2 initiates the transmission of the ACK packet after a period of time indicated by the offset information #2 is elapsed from the end of reception of the data packet (DATA#2), and the station 20#3 initiates the transmission of the ACK packet after a period of time indicated by the offset information #3 is elapsed from the end of reception of the data packet (DATA#3).

As such, the data processing unit 48 of the access point 10 sets the offset information such that the transmission timings of the ACK packets from the stations 20#1~#3 do not overlap each other on the time axis. More specifically, the data processing unit 48 may set offset information such that the transmission timings of the ACK packets do not overlap each other on the time axis even in the case of a maximum error of SIFS by taking into account an allowable error of SIFS (+−10%) according to IEEE 802.11.

By means of such a structure, the data processing unit 48 of the access point 10 may determine a transmission source station 20 of an ACK packet based on the offset information set for each of the stations 20 and the reception timing of the ACK packet. For example, the data processing unit 48 of the access point 10 may determine a station 20, which has offset information set to correspond to the reception timing of an ACK packet, as a transmission source station of the ACK packet.

On the other hand, according to the above-mentioned access control method, since the CTS packets are simultaneously transmitted from the plurality of stations 20 as described above, it becomes a problem whether or not the neighboring wireless device 30 may normally receive the CTS packet and set NAV. For example, if the neighboring wireless device 30#4 does not normally receive a CTS packet when the station 20#1 and the station 20#3 transmit the CTS packet at the same time, the neighboring wireless device 30#4 hinders the communication by the access point 10.

Figure 8:
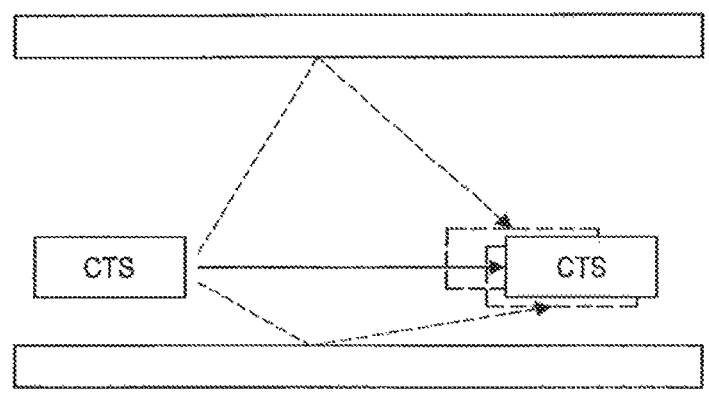
FIG. 8 is an explanatory diagram illustrating transmission in a multi-path environment.

A great number of wireless communication devices conforming to IEEE 802.11 or the like insert a guide interval into each OFDM symbol taking into account a multi-path environment as shown in FIG. 8. On this account, a wireless communication device at a receiving party may normally receive a signal which is deviated with respect to time within a predetermined range.

In order to solve the foregoing problem, in the embodiment of the present invention, each of the stations 20 transmits the same CTS packet rather than a CTS packet with an orthogonal training field added as shown in FIG. 2. By means of such a configuration, the neighboring wireless device 30#4 may normally receive CTS packets, which are transmitted from different stations 20#1 and 20#3, as CTS packets which arrive from the same transmission source at different timings under a multi-path environment, and set NAV.

Modified Examples of Offset Information

In the foregoing, there has been described the offset information where the lengths of time of data packets for each of the stations 20 are identical to each other. However, the lengths of time of data packets for each of the stations 20 may be different from each other. In a case where lengths of time of data packets for each of the stations 20 are different from each other, a method of setting offset information will be described.

Figure 9:
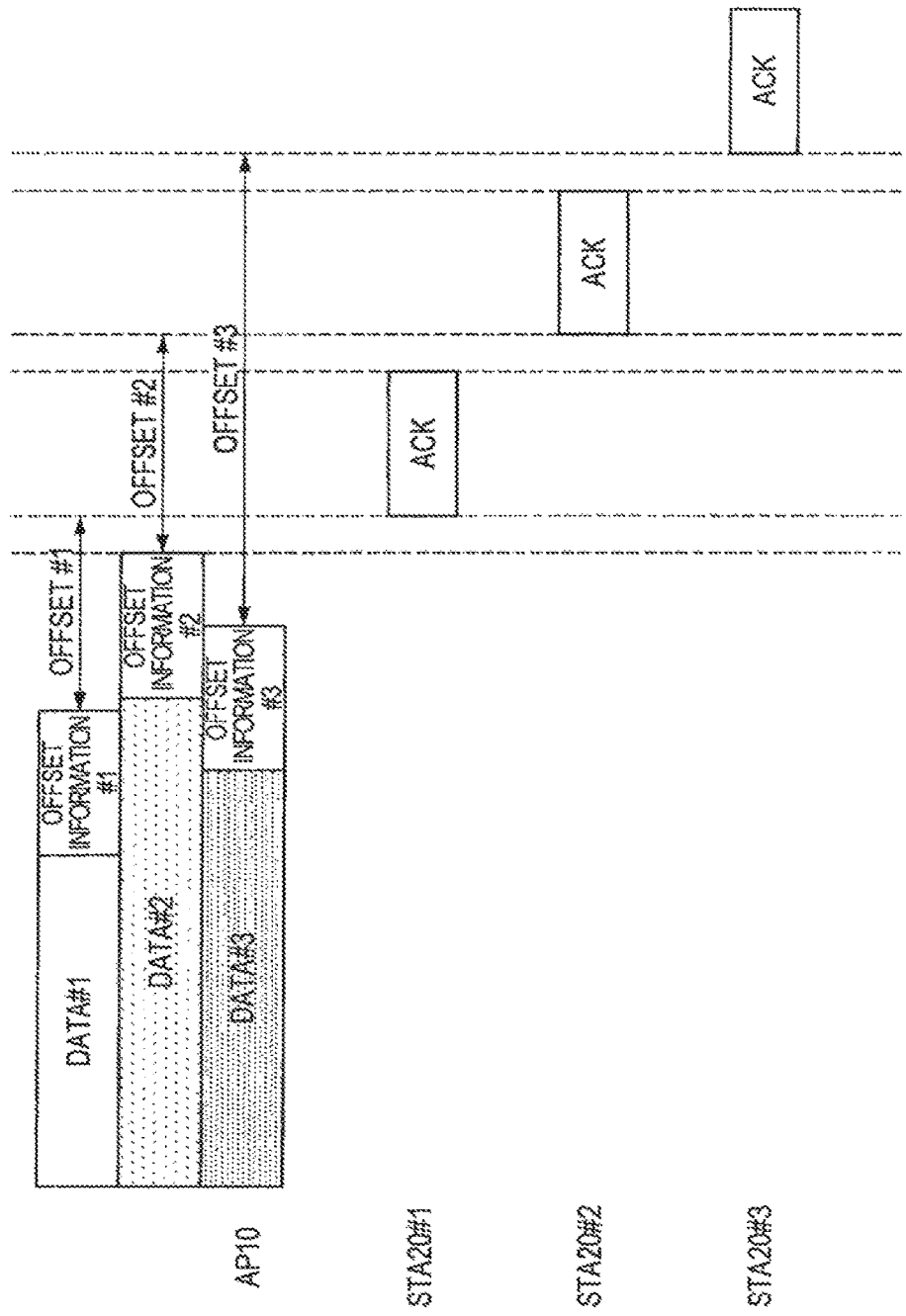
FIG. 9 is an explanatory diagram illustrating a first modified example of offset information.

FIG. 9 is an explanatory diagram illustrating a first modified example of the offset information. As shown in FIG. 9, the offset information may be information indicating an offset from the end of reception of a data packet by each of the stations 20.

Specifically, the offset information #1 for the station 20#1 may indicate offset #1 between the end of reception of a data packet by the station 20#1 and the initiation of transmission of an ACK packet. Likewise, the offset information #2 for the station 20#2 may indicate offset #2 between the end of reception of a data packet by the station 20#2 and the initiation of transmission of an ACK packet, and the offset information #3 for the station 20#3 may indicate offset #3 between the end of reception of a data packet by the station 20#3 and the initiation of transmission of an ACK packet.

Figure 10:
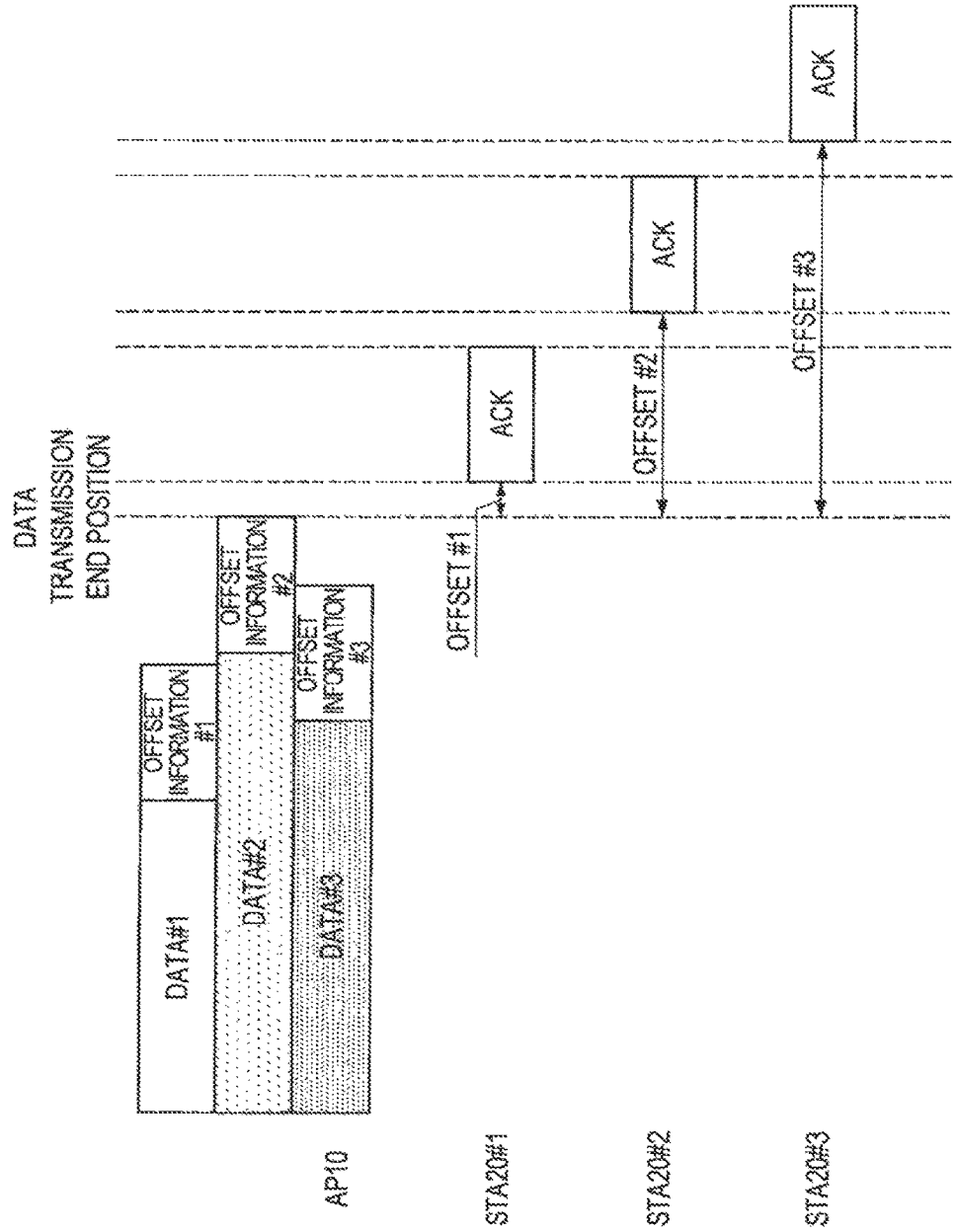
FIG. 10 is an explanatory diagram illustrating a second modified example of offset information.

FIG. 10 is an explanatory diagram illustrating a second modified example of the offset information. As shown in FIG. 10, the offset information may be information indicating a data transmission end position for a station 20 where the end of data transmission from the access point 10 is the latest, and an offset between the data transmission end position and the initiation of transmission of an ACK packet.

Specifically, the offset information #1 for the station 20#1 may be information indicating a data transmission end position t for the station 20#2 where the end of data transmission from the access point 10 is the latest, and the offset #1 between the data transmission end position t and the initiation of transmission of an ACK packet.

The offset information #2 for the station 20#2 may be information indicating the data transmission end position t and the offset #2 between the data transmission end position t and the initiation of transmission of an ACK packet. Likewise, the offset information #3 for the station 20#3 may be information indicating the data transmission end position t and the offset #3 between the data transmission end position t and the initiation of transmission of an ACK packet.

4. OPERATION OF WIRELESS COMMUNICATION DEVICE

In the foregoing, the access control according to the embodiment of the present invention has been described.

Subsequently, the operations of the access point 10 and the station 20 according to an embodiment of the present invention will be described.
(Operation of Access Point)

Figure 11:
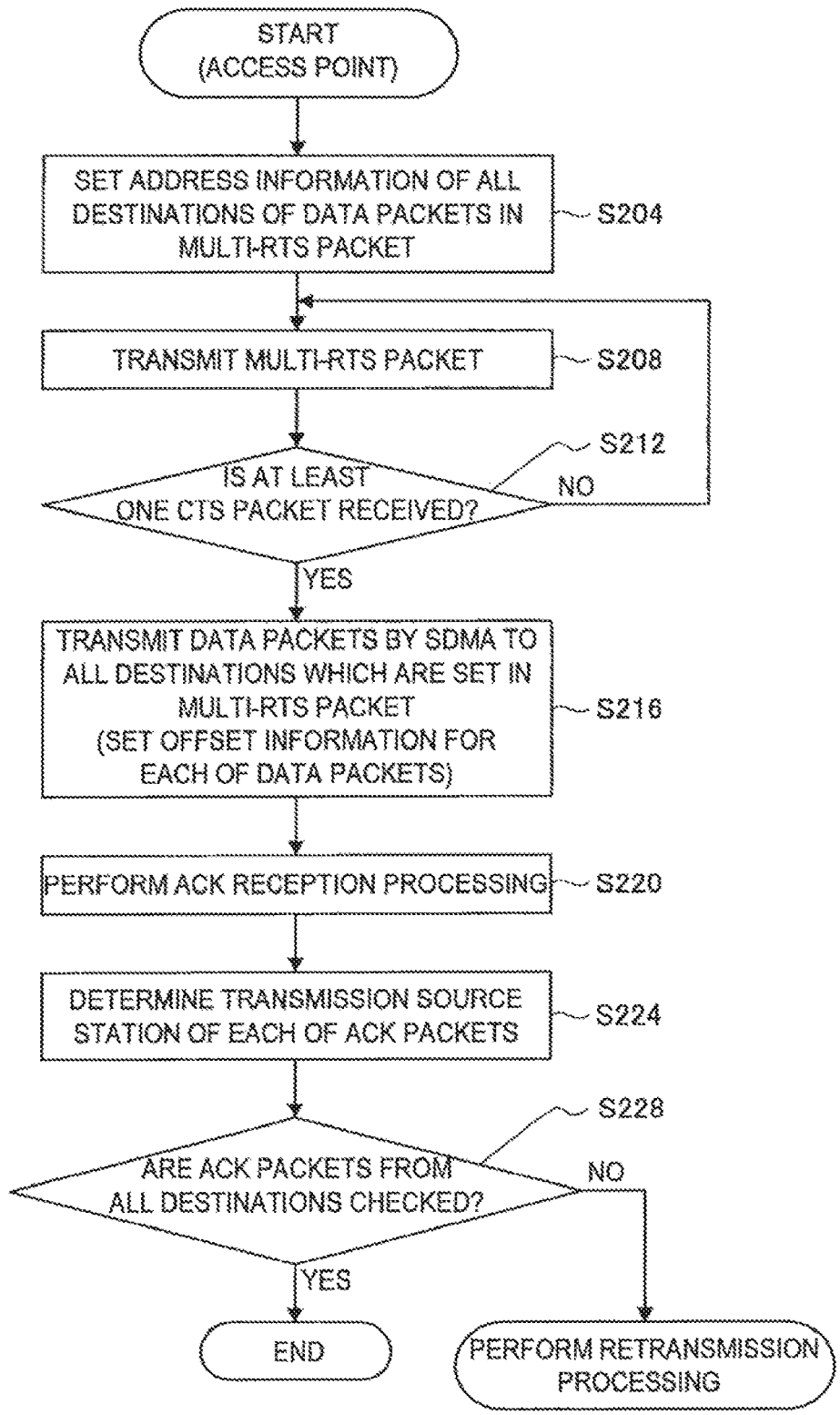
FIG. 11 is a flow chart illustrating the operation of an access point according to an embodiment of the present invention.

FIG. 11 is a flow chart illustrating the operation of the access point 10 according to an embodiment of the present invention. As shown in FIG. 11, the data processing unit 48 of the access point 10 sets address information and offset information of all destinations of data packets in the multi-RTS packet (S204). The branches 40 of the access point 10 transmit the multi-RTS packet generated by the data processing unit 48 (S208).

Next, if at least one CTS packet is received by the branches 40 of the access point 10 (S212), the data processing unit 48 spatially multiplexes the data packets by SDMA and transmits the spatially multiplexed data packets to all of destinations which are set in the multi-RTS packet (S216).

The data processing unit 10 sets offset information for a data packet for each of the stations 20. The setting of the offset information is not limited to a specific method. For example, the data processing unit 10 may set the offset information for each of the stations 20 by the methods described in [Modified Examples of Offset Information].

Further, the access point 10 may not normally decode CTS packets when the CTS packets are transmitted from a plurality of stations 20. In this case, the data processing unit 48 of the access point 10 may determine that a CTS packet has been transmitted from at least one of the stations 20 if any signal is received by the branch 40 in the time zone when a CTS packet is expected to be received.

Next, if ACK packets are received (S220), the data processing unit 48 of the access point 10 determines a transmission source station of each of the ACK packets (S224). Specifically, the data processing unit 48 of the access point 10 may determine the transmission source station of each of the ACK packets based on the offset information set for each of the stations 20 and the reception timing of each of the ACK packets. For example, the data processing unit 48 of the access point 10 may determine a station 20, for which offset information corresponding to the reception timing of an ACK packet is set, as a transmission source station of a CTS packet.

The access point 10 terminates a series of transmission sequences if the access point 10 can check ACK packets from all of destinations, or proceeds with a retransmission process if the access point 10 cannot check ACK packets from some of the destinations (S228).
(Operation of Station)

FIG. 12 is a flow chart illustrating the operation of the station 20 according to an embodiment of the present invention. As shown in FIG. 12, if a packet is received by the branch of the station 20, the data processing unit 48 of the station 20 determines whether or not the received packet is a multi-RTS packet (S304).

Further, if the received packet is a multi-RTS packet, the data processing unit 48 of the station 20 checks whether or not address information of the station 20 is recorded on the multi-RTS packet (S308). If the address information of the station 20 is recorded on the multi-RTS packet, the station 20 transmits a CTS packet to the access point 10.

Specifically, if there is a training request in the multi-RTS packet (S312), the station 20 transmits a CTS packet containing a training field for channel estimation of the access point 10 (S316). On the other hand, if there is no training request in the multi-RTS packet (S312), the station 20 transmits a general CTS packet containing no training field (S320).

Subsequently, if the branch 40 of the station 20 receives a data packet, for which offset information is set, from the access point 10 (S324), the data processing unit 48 of the station 20 counts down an offset value indicated by the offset information (S328).

Next, if the countdown of the offset value by the data processing unit 48 of the station 20 is completed, the branch 40 of the station 20 transmits an ACK packet to the access point 10.

If the station 20 receives a packet other than the multi-RTS packet, the station 20 performs a process corresponding to the received packet (S304). If the received multi-RTS packet does not contain address information of its own device, the station 20 sets NAV (Network Allocation Vector) based on duration information included in the multi-RTS packet (S308).

5. CONCLUSION

As described above, the access point 10 according to the embodiment of the present invention spatially multiplexes the data packets (DATA#1~DATA#3) and transmits the spatially multiplexed data packets (DATA#1~DATA#3) to all of the stations 20#1~#3, which are set in the multi-RTS packet, without determining the transmission source stations of the CTS packets. Further, the access point 10 correctly determines the transmission source station of each of the ACK packets by dispersing the transmission of the ACK packets from the stations 20#1~#3 in time.

The access control method according to the embodiment of the present invention can suppress the overhead during the RTS/CTS handshake compared to the access control method described with reference to FIG. 3. Further, according to the embodiment of the present invention, since the IEEE 802.11 standard states that an allowable error of SIFS by the station 20 is about +−10%, the embodiment of the present invention is effective in terms of easy mounting.

The preferred embodiments of the present invention have been described above with reference to the accompanying drawings, whilst the present invention is not limited to the above examples. A person skilled in the art may find various alternations and modifications within the scope of the appended claims, and it should be understood that they will naturally come under the technical scope of the present invention.

For example, it should be noted that the steps of the operations of the access point 10 and the wireless communication device 20 are not necessarily performed in time series in the order described in the flow chart. For example, the steps of the operations of the access point 10 and the wireless communication device 20 may be processed in a different order from the order described in the flow chart or in a parallel manner.

Further, it has been described above with reference to FIGS. 9 and 10 that the access point 10 sets each offset information such that an ACK response is transmitted after the data transmission from the access point 10 to all of the stations 20 has been ended. That is because the access point 10 may not perform the data transmission and the ACK reception at the same time. However, the embodiment of the present invention is not limited to the above-mentioned example. For a modified example, although the data transmission from the access point 10 to all of the stations 20 is not ended, an ACK response may be transmitted from each of the stations 20 one after another when the data transmission to each of the stations 20 is ended. For example, in the example shown in FIG. 10, if the data transmission from the access point 10 to the station 20#1 is ended, an ACK response may be transmitted from the station 20#1 even before the data transmission end position t. By means of such a configuration, since a period of time taken until the access point 10 completes the reception of all of the ACK packets is shortened, it is possible to improve the throughput.

In addition, it is possible to make a computer program configured for hardware, such as CPU, ROM and RAM, which is incorporated in the access point 10 and the wireless communication device 20, to execute the same function as that of each of elements of the access point 10 and the wireless communication device 20. Further, a storage medium for storing the computer program is also provided.

REFERENCE SIGNS LIST

10 Access point
20 Station
40, 40-1, 40-2, 40-N Branch
42, 42-1, 42-2, 42-N Antenna element
44, 44-1, 44-2, 44-N Receiver unit
46, 46-1, 46-2, 46-N Transmitter unit
48 Data processing unit

The invention claimed is:
1. An electronic device, comprising:
circuitry configured to:
transmit a multi-request to send (multi-RTS) packet to at least a first wireless communication device and a second wireless communication device,
    wherein the multi-RTS packet comprises identification information of the first wireless communication device and the second wireless communication device,
    wherein the first wireless communication device transmits, in response to the multi-RTS packet, a first clear to send (CTS) packet and the second wireless communication device transmits, in response to the multi-RTS packet, a second CTS packet simultaneously with the transmission of the first CTS packet, and
    wherein the first CTS packet and the second CTS packet include a same training field;
receive at least one of the first CTS packet from the first wireless communication device or the second CTS packet from the second wireless communication device,
    wherein the first wireless communication device transmits the first CTS packet after a short inter-frame space (SIFS) from a first reception time instance of the multi-RTS packet at the first wireless communication device, and
    wherein the second wireless communication device transmits the second CTS packet after the SIFS from a second reception time instance of the multi-RTS packet at the second wireless communication device; and
transmit a multiplexed data packet to the two first wireless communication device and the second wireless communication device, based on reception of the at least one of the first CTS packet or the second CTS packet,
    wherein the multiplexed data packet includes a first data packet for the first wireless communication device and a second data packet for the second wireless communication device.

2. The electronic device of claim 1,
wherein the circuitry is further configured to transmit a single RTS (single-RTS) packet to one of the first wireless communication device or the second wireless communication device, and
wherein the single-RTS packet comprises destination address information, such that the one of the first wireless communication device or the second wireless communication device executes one of a first process for the single-RTS packet or a second process for the multi-RTS packet.

3. The electronic device of claim 2, wherein the second process corresponds to determination that the identification information of each of the first wireless communication device and the second wireless communication device includes own address information of the one of the first wireless communication device or the second wireless communication device.

4. The electronic device of claim 1,
wherein the circuitry is further configured to set offset information in the first data packet, and
wherein the offset information corresponds to time information.

5. The electronic device of claim 4, wherein the time information indicates timing of transmission of an acknowledgement (ACK) packet from the first wireless communication device.

6. A first electronic device, comprising:
circuitry configured to:
receive a multi-request to send (multi-RTS) packet from a second electronic device,
wherein the multi-RTS packet comprises identification information of a first wireless communication device and a second wireless communication device, and
wherein the first electronic device is one of the first wireless communication device or the second wireless communication device;
transmit a first clear to send (CTS) packet to the second electronic device after a short inter-frame space (SIFS) from a reception time instance of the multi-RTS packet,
wherein the second wireless communication device transmits, in response to the multi-RTS packet, a second CTS packet simultaneously with the transmission of the first CTS packet, and
wherein the first CTS packet and the second CTS packet include a same training field; and
receive at a multiplexed data packet from the second electronic device,
wherein the second electronic device transmits the multiplexed data packet to the first wireless communication device and the second wireless communication device, based on reception of the at least one of the first CTS packet or the second CTS packet, and
wherein the multiplexed data packet includes a first data packet for the first wireless communication device and a second data packet for the second wireless communication device.

7. The first electronic device of claim 6, wherein the circuitry is further configured to:
receive a single RTS (single-RTS) packet from the second electronic device, wherein the single-RTS packet comprises destination address information; and
execute at least one of a first process for the single-RTS packet or a second process for the multi-RTS packet, based on the destination address information.

8. The first electronic device of claim 7, wherein in the second process, the circuitry is further configured to determine that the identification information includes own address information of the first electronic device.

9. The first electronic device of claim 6, wherein the second electronic device sets offset information in the first data packet, and
wherein the offset information corresponds to time information.

10. The first electronic device of claim 9, wherein the time information indicates timing of transmission of an acknowledgement (ACK) packet from the first electronic device.

11. A wireless communication method, comprising:
transmitting a multi-request to send (multi-RTS) packet to at least a first wireless communication device and a second wireless communication device,
wherein the multi-RTS packet comprises identification information of the first wireless communication device and the second wireless communication device,
wherein the first wireless communication device transmits, in response to the multi-RTS packet, a first clear to send (CTS) packet and the second wireless communication device transmits, in response to the multi-RTS packet, a second CTS packet simultaneously with the transmission of the first CTS packet, and
wherein the first CTS packet and the second CTS packet include a same training field;
receiving at least one of the first CTS packet from the first wireless communication device or the second CTS packet from the second wireless communication device,
wherein the first wireless communication device transmits the first CTS packet after a short inter-frame space (SIFS) from a first reception time instance of the multi-RTS packet at the first wireless communication device, and
wherein the second wireless communication device transmits the second CTS packet after the SIFS from a second reception time instance of the multi-RTS packet at the second wireless communication device; and
transmitting a multiplexed data packet to the first wireless communication device and the second wireless communication device, based on reception of the at least one of the first CTS packet or the second CTS packet,
wherein the multiplexed data packet includes a first data packet for the first wireless communication device and a second data packet for the second wireless communication device.

12. A wireless communication method, comprising:
receiving a multi-request to send (multi-RTS) packet from an electronic device,
wherein the multi-RTS packet comprises identification information of at least a first wireless communication device and a second wireless communication device;
transmitting a first clear to send (CTS) packet to the electronic device after a short inter-frame space (SIFS) from a reception time of the multi-RTS packet,
wherein the second wireless communication device transmits, in response to the multi-RTS packet, a second CTS packet simultaneously with the transmission of the first CTS packet, and
wherein the first CTS packet and the second CTS packet include a same training field; and receiving a multiplexed data packet from the electronic device,
- wherein the electronic device transmits the multiplexed data packet to the first wireless communication device and the second wireless communication device, based on reception of the at least one of the first CTS packet or the second CTS packet, and
- wherein the multiplexed data packets includes a first data packet for the first wireless communication device and a second data packet for the second wireless communication device.

\* \* \* \* \*